United States Patent [19]
Campbell

[11] Patent Number: 6,038,535
[45] Date of Patent: Mar. 14, 2000

[54] SPEECH CLASSIFIER AND METHOD USING DELAY ELEMENTS

[75] Inventor: William Michael Campbell, Phoenix, Ariz.

[73] Assignee: Motorola, Inc., Schaumburg, Ill.

[21] Appl. No.: 09/045,917

[22] Filed: Mar. 23, 1998

[51] Int. Cl.[7] .................................................... G10L 7/08
[52] U.S. Cl. .......................................... 704/275; 704/231
[58] Field of Search .................................... 704/222, 232, 704/270, 275, 231, 236, 250, 246, 251, 255, 245, 230

[56] References Cited

U.S. PATENT DOCUMENTS

| | | | |
|---|---|---|---|
| 5,440,662 | 8/1995 | Sukkar .................................... | 395/2.45 |
| 5,467,425 | 11/1995 | Lau et al. ................................ | 395/2.52 |
| 5,522,011 | 5/1996 | Epstein et al. .......................... | 395/2.31 |
| 5,594,834 | 1/1997 | Wang ....................................... | 704/253 |
| 5,621,858 | 4/1997 | Stork et al. .............................. | 704/232 |
| 5,680,481 | 10/1997 | Prasad et al. ........................... | 382/190 |
| 5,794,190 | 8/1998 | Linggard et al. ........................ | 704/232 |
| 5,805,771 | 9/1998 | Muthusamy et al. ................... | 704/232 |
| 5,924,066 | 7/1999 | Kunbdu ................................... | 704/232 |

OTHER PUBLICATIONS

An article entitled "Tensor Product Basis Approximations For Volterra Filters", by Robert D. Nowak, and Barry D. Van Veen, IEEE members, from IEEE Transactions On Signal Processing, vol. 44, No. 1, Jan. 1996.

An article entitled "Temporal Processing", by Simon Haykin from Neutral Networks, A Comprehensive Foundation, 1994.

*Primary Examiner*—Richemond Dorvil
*Attorney, Agent, or Firm*—Harold C. McGurk; Gregory J. Gorrie

[57] ABSTRACT

Classifiers (110) and a selector (112) perform an identification method (300) to identify an ordered set of vectors (e.g., spoken commands, phoneme identification, radio signatures, communication channels, etc.) representing a class as one of a predetermined set of classes. Training processor (104) performs a training method (200) to train a set of models and store the models in a model memory (108). Classifiers (110) receive models from the model memory and combine the models with the ordered set of vectors to determine a set of scores. The selector associates the set of scores with the predetermined set of classes to identify the ordered set of vectors as a class from the predetermined set of classes.

4 Claims, 3 Drawing Sheets

100

SPEECH CLASSIFIER AND METHOD USING DELAY ELEMENTS

FIELD OF THE INVENTION

This invention relates in general to the field of classifiers, and, in particular, to polynomial classifiers.

BACKGROUND OF THE INVENTION

Modern classifiers use techniques which are highly complex when high accuracy classification is needed. For example, a traditional neural network structure needing high accuracy also needs a complex structure to perform classification because of difficulty in grouping different classes within the neural network structure.

Additionally, in speech recognition systems, when a spoken command is identified, the spoken command is identified as one of a group of commands represented by a collection of command models. Existing speech recognition systems require large amounts of processing and storage resources to identify a spoken command from a collection of command models because the systems fail to use ordering information (e.g., time-ordering) for training command models and for identifying spoken commands.

A problem with existing systems is that polynomial classifiers fail to use ordering information (e.g., time-ordering, event-ordering, characteristic-ordering, etc.) when performing identification of classes (e.g., spoken commands, phoneme identification, radio signatures, communication channels, etc.). Additionally, another problem with training systems for polynomial classifiers is that systems fail to train models using a method which exploits ordering information within training data.

Another problem with speech systems is the complexity of determining boundaries between spoken commands (e.g., words). The boundaries between spoken commands are important in speech recognition because boundaries are used to segment between spoken commands.

Existing systems also have a problem in detecting an acoustic context. For example, systems needing to detect an acoustic context have difficulty doing so because acoustic models of such systems fail to include ordering information. Failing to determine an acoustic context is a problem when a system needs to detect the onset and steady state of acoustic phones. Word spotting is similarly difficult to perform because existing systems exclude ordering information when determining word models.

Thus, what is needed are a system and method which use ordering information when performing identification of classes. What is also needed are a system and method which use ordering information contained within training data to train models.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DETAILED DESCRIPTION OF THE PREFERRED EMBODIMENTS

The present invention provides a system and method that uses ordering information when performing identification of classes. The present invention also provides a system and method that uses ordering information contained within training data to train models. The present invention provides an improved system and method for determining boundaries between spoken commands. The present invention provides an improved system and method for detecting an acoustic context. The present invention also provides an improved system and method for performing word spotting.

A "class" is defined herein to mean a category (e.g., label) provided to a representation of an item. For example, the word "go" is the class (e.g., label) associated with a feature vector representation of a speech sample of an individual speaking the word "go". A "class" may also refer to a category (e.g., label) provided to a group of items. A "class label" is defined herein to mean a label associated with a class. A "class structure" is defined herein to mean a vector. When the vector is a class structure, the vector is a summation of a set of feature vectors which represent the class or classes associated therewith. A "model" is defined herein to mean a vector. When the vector is a class model, the vector has elements which are weighted based primarily on the class associated therewith. A "feature vector" is defined herein to mean a vector which represents the characteristics of an item. For example, when a removed silence speech sample is represented as a set of cepstral coefficients, the cepstral coefficients representing the speech sample are referred to as a "feature vector". Examples of feature vectors include, among other things, spoken commands, phonemes, radio signatures, communication channels, modulated signals, biometrics, facial images, and fingerprints.

Figure 1:
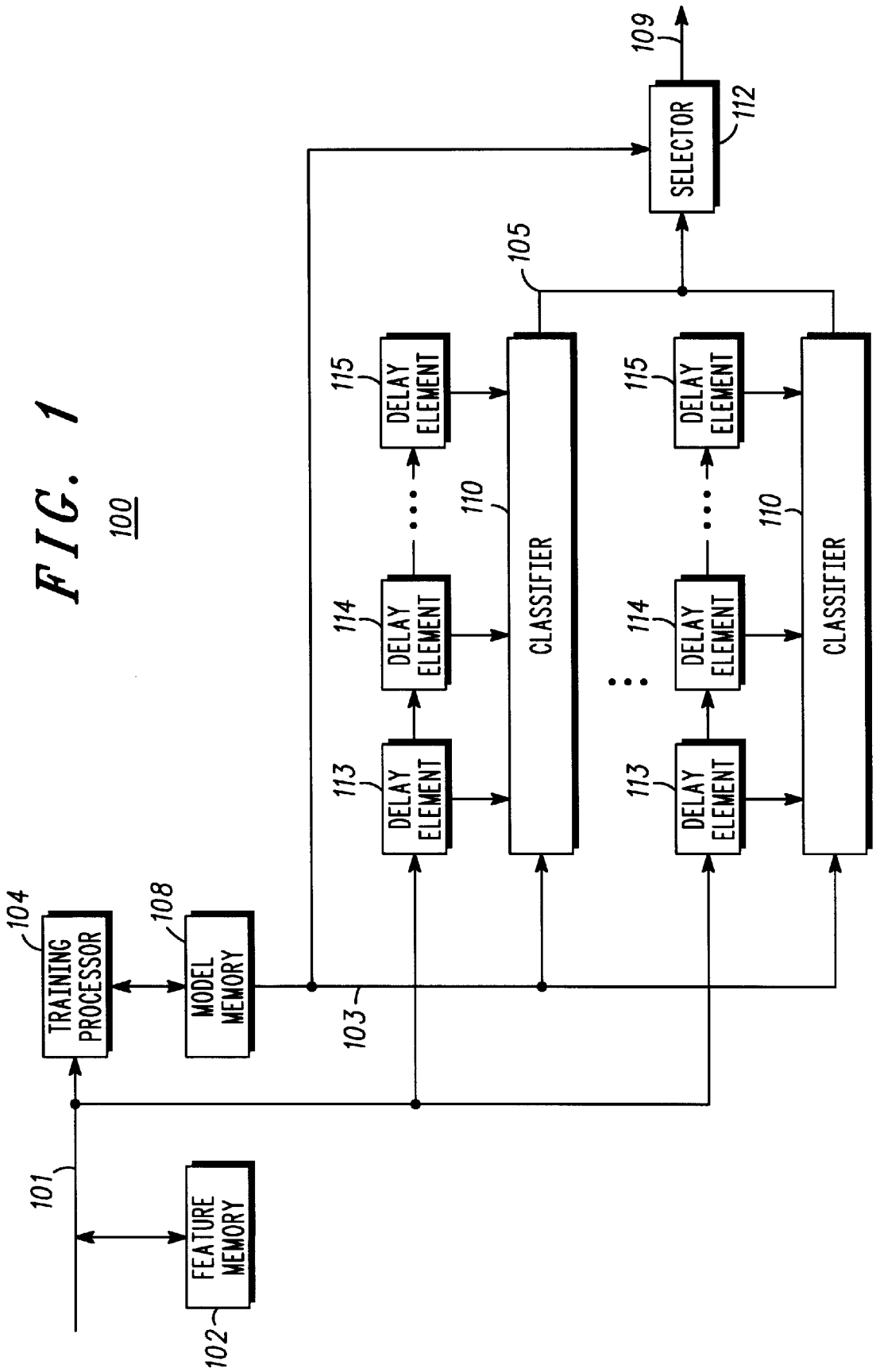
FIG. 1 illustrates a simplified classifier and training system in accordance with a preferred embodiment of the present invention.

FIG. 1 illustrates a simplified classifier and training system in accordance with a preferred embodiment of the present invention. Classifier and training system (CTS) 100 illustrates a system capable of identifying a class and training a set of models, each of the set of models represents at least one of a plurality of classes. In a preferred embodiment of the present invention, CTS 100 includes feature memory 102, training processor 104, model memory 108, classifiers 110, selector 112, and delay elements 113–115.

CTS 100 may be implemented in hardware, software, or a combination of hardware and software. In a preferred embodiment, CTS 100 is implemented in software.

Training processor 104 is preferably coupled to feature memory 102 via feature vector input 101. Additionally, training processor 104 is coupled to model memory 108. Preferably, training processor 104 retrieves feature vectors from feature memory 102 and receives feature vectors from an external system via feature vector input 101. In a preferred embodiment, feature vectors stored in feature memory 102 represent a group of classes. Preferably, training processor 104 determines models based on feature vectors by performing a training procedure discussed below. When training for models is complete, training processor 104 preferably stores models in model memory 108.

Classifiers 110 are preferably coupled to model memory 108 via model input 103. Classifiers 110 are also coupled to delay elements 113–115. Classifiers 110 receive feature vectors from delay elements 113–115. Classifiers 110 are also coupled to selector 112 via classifier outputs 105. In a preferred embodiment, each of classifiers 110 receives a model from model memory 108 and combines (e.g., performs a dot product) the model with unidentified feature vectors received via delay elements 113–115. Preferably, the output from each of classifiers 110 is a series of scalar numbers, one scalar number for each combination of a model and an unidentified feature vector. Preferably, classifiers 110 receive a feature vector from each of delay elements 113–115. Classifiers 110 preferably concatenate the feature vectors thus creating a feature vector dimensionally equivalent to the number of delay elements 113–115 multiplied by the number of coefficients in a feature vector. Preferably, the number of delay elements 113–115 is on the order of five or six, although a range of two to over fifty delay elements 113–115 is acceptable.

The order of loading feature vectors into delay elements 113–115 is preferably a first-in first-out (FIFO) scheme. For example, when a first set of feature vectors are loaded into delay elements 113–115, a first feature vector, f1, is loaded into delay element 113 and random feature vectors, f0, are loaded into delay elements 114–115. After classifiers 110 perform an identification method (described below) using the first set of feature vectors, a second set of feature vectors are loaded into delay elements 113–115. A second set of feature vectors would map into delay elements 113–115 as follows: feature vector f1 is output from delay element 113 and is received by delay element 114; feature vector f2 is received by delay element 113 from feature vector input 101; and feature vector f0 is again loaded into delay element 115. Preferably, each feature vector representing an unidentified class is propagated through each delay element until each feature vector has occupied each of delay elements 113–115.

In combination with selector 112, classifiers 110 preferably perform a method for identifying a class from a predetermined set of classes (discussed below).

Selector 112 is preferably coupled to classifiers 110 via classifier outputs 105. Selector 112 is also coupled to model memory 108 via model input 103. Selector 112 generates class label output 109 based on an association between models stored in model memory 108 and inputs received from classifiers 110. Preferably, each of classifiers 110 provides a series of scalar numbers to selector 112. Each scalar number represents a combination operation (e.g., dot product) performed by classifiers 110 as discussed above. Preferably, selector 112 receives a series of scalar numbers from each of classifiers 110 and associates the series of scalar numbers with class labels representing each of the models.

In a preferred embodiment, selector 112 performs a summation of each of the series of scalar numbers received from each of classifiers 110. When the summation of scalars is complete, selector 112 preferably computes an average for each of the series of scalars. In one embodiment, the model, and therefore the class and class label, associated with the largest average identifies the unidentified class as at least one of a plurality of predetermined classes (e.g., models) stored in model memory 108.

Figure 2:
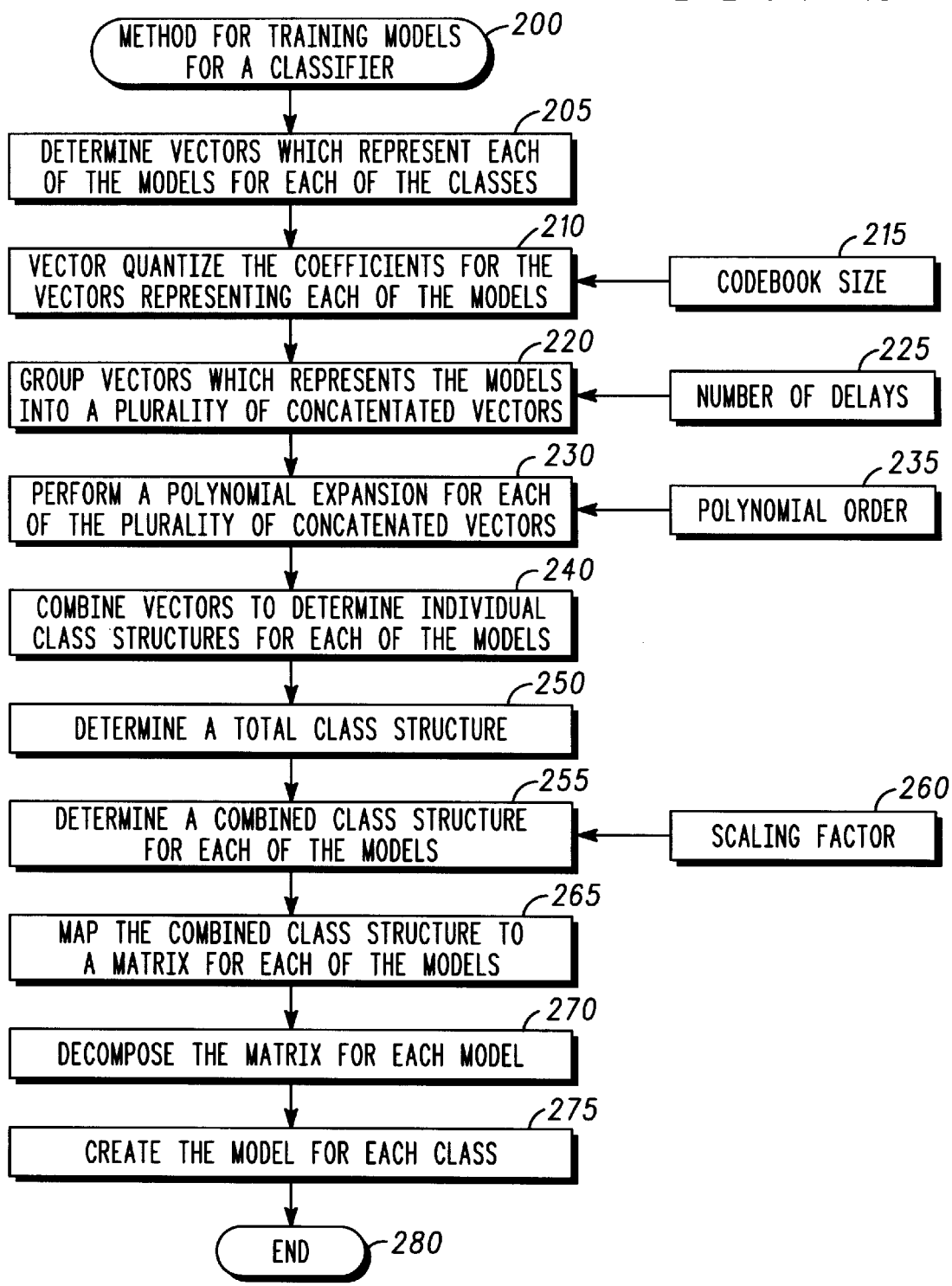
FIG. 2 is a flowchart illustrating a method for training a model for use in a classifier in accordance with a preferred embodiment of the present invention.

FIG. 2 is a flowchart illustrating a method for training a model for use in a classifier in accordance with a preferred embodiment of the present invention. In a preferred embodiment, method 200 is performed by a training processor to train (e.g., create) a plurality of models for use in an identification method (discussed below). Preferably, each of the plurality of models represents a class and a class label.

In step 205, vectors which represent each of the models for each of the classes is determined. For example, in a speech recognition system, a model, and therefore a class, may represent a spoken command from a speaker. A set of classes may represent a set of commands spoken by a single speaker or a group of speakers. Preferably, the vectors which represent the models and classes are feature vectors.

In another embodiment, feature vectors represent classes of AM and FM radio channels, wherein a different class represents each radio channel. Other embodiments of the present invention include, among other things, feature vectors which represent spoken language, modulated signals, radio signatures, biometrics, facial images, and fingerprints.

In a preferred embodiment, when a set of feature vectors represents a class and each class represents a spoken command, feature vectors are determined from a speech sample. A set of feature vectors is determined from a series of overlapping windows of sampled speech (e.g., Hamming windows). Preferably, a feature vector is created for each Hamming window, wherein, each Hamming window represents a speech sample having the silence removed.

In a preferred embodiment, an linear predictive (LP) analysis is performed and includes generating a predetermined number of coefficients for each Hamming window of the removed silence speech sample. Preferably the number of coefficients for the LP analysis is determined by the LP order. LP orders of 10, 12 and 16 are desirable however other LP orders may be used. A preferred embodiment uses an LP order of 12. In a preferred embodiment, step 205 generates 12 coefficients for every Hamming window (e.g., every 10 milliseconds, 30 milliseconds of removed silence speech). The result of step 205 may be viewed as a Z×12 matrix, where Z is the number of rows and 12 (the LP order) is the number of columns. Z is dependent on the length of the removed silence speech sample, and may be on the order of several hundred or thousand rows. The Z×12 matrix of step 205 may also be viewed as Z sets of LP coefficients. In this example, there are 12 LP coefficients for every Hamming window of the removed silence speech. Each set of LP coefficients represents a feature vector. Additionally, cepstral coefficients are determined from the LP coefficients.

In a preferred embodiment, step 205 includes performing a linear transform on the LP coefficients. Preferably, the linear transformation performed includes a cepstral analysis which separates unwanted from wanted information retaining information important to speech recognition. Performing the cepstral analysis is an optional part of step 205, however, for accurately identifying speech, cepstral analysis should be performed. Determining cepstral coefficients is a process known in the art. The result of performing the cepstral analysis may be viewed as a Z×24 matrix where 12 is the cepstral order. The cepstral order may be the same order as the LP order. The collection of feature vectors for the series of Hamming windows is comprised of either the sets of LP coefficients or cepstral coefficients associated therewith.

In step 210, the coefficients for the vectors representing each of the models are vector quantized. In a preferred embodiment, a vector quantization is performed on the cepstral coefficients of the feature vectors representing the class. In a preferred embodiment, one purpose of step 210 is to cluster the speech information for each spoken command into a common size matrix representation. Step 210 is performed since step 205 may produce a different number of feature vectors for each spoken command because each command may have a speech sample of a different time length. The vector quantization of step 210 results in a predetermined number of feature vectors for each spoken command. Codebook size input 215 is an input to step 210 and represents the number of feature vectors to be determined in step 210.

Alternative to step 210, another embodiment of the present invention uses a fixed codebook (e.g., as used by a vocoder). When a fixed codebook size is used, each feature vector is quantized using the fixed codebook. This alternative embodiment allows indices of predetermined feature vectors to be stored in memory instead of storing feature vectors. Indices are preferably represented as an integer and require less storage space than storing feature vectors representing each class. Indices are used as an index into the codebook where feature vectors are preferably stored. Storing indices instead of feature vectors may be chosen when limiting the amount of memory is preferred over processing performance.

In step 220, vectors, which represent the models, are grouped into a plurality of concatenated vectors. In a preferred embodiment, each of the feature vectors are grouped into concatenated vectors. For example, assume a class was represented by three feature vectors (e.g., f1, f2, f3). In the embodiment where collections of two feature vectors are to be grouped, the groups are as follows: f1, f0; f2, f1; f3, f2; and f0, f3; where f0 represents an experimentally determined vector dimensionally similar to feature vectors f1, f2, and f3. Preferably, f0 is experimentally determined to be a random vector. Feature vector f0 is also referred to as a "universal background vector".

Preferably, number of delays input 225 determines the number of vectors which are grouped. Groups of two concatenated vectors are referred to as "vector pairs". In the example where vectors are grouped as vector pairs and each feature vector has 12 coefficients, each vector pair is dimensionally 24. In a preferred embodiment, number of delays input 225 is on the order of five or six although numbers ranging from two to fifty or more are acceptable. Additionally, number of delays input 225 is preferably equivalent to the number of delay elements 113–115 (FIG. 1).

Additionally, the number of feature vectors grouped (e.g., concatenated) in step 220 may be on the order of ones, tens, thousands or more. Desirably, the number of feature vectors grouped in step 220 is on the order of ones and tens.

In step 230, a polynomial expansion for each of the plurality of concatenated vectors is performed. In a preferred embodiment, a high order polynomial expansion is performed on each concatenated vector representing each class. Preferably, the high order polynomial expansion is a fourth order polynomial expansion; although, other polynomial orders are suitable. Preferably, the polynomial order for the high order polynomial expansion performed in step 230 is determined from polynomial order input 235. Desirably, the polynomial order input 235 is in the range of 2 to 4. The results of step 230 are viewed as one matrix. When the cepstral order is 12 and cepstral coefficients are calculated, the high order polynomial expansion, when performed for each concatenated vector, produces a high order matrix of dimension codebook size input number of rows and 20,475 columns.

In step 240, vectors are combined to determine individual class structures for each of the models. In a preferred embodiment, an individual class structure is determined by summing the feature vectors of the high order matrix determined in step 230. In a preferred embodiment, the individual class structure is calculated for each class. The result of step 240 is a single vector (e.g., individual class structure) of same dimension as a single vector of the high order matrix. In the embodiment having a high order matrix with the dimensions discussed in step 230, the resultant individual class structure (vector) has 20,475 elements.

In step 250, a total class structure is determined. In a preferred embodiment, a summation of each individual class structure is performed to determine the total class structure. Preferably, the summation is performed using the individual class structures determined in step 240.

In step 255, a combined class structure for each of the models is determined. In a preferred embodiment, the combined class structure, $r_{A,combined}$, for a class is determined by adding the total class structure (step 250) and a scaled version of an individual class structure associated therewith. For example, when a model is trained for 5 classes (e.g., class 1, class 2, . . . class 5) and class A represents two classes (e.g., class 1 and class 4), the combined class structure representing class A is provided by equation (eqn.) 1, $$r_{A,combined} = r_{total} + ((N_{all}/(N_1+N_4))-2)*r_{A,class}, \quad (\text{eqn. 1})$$

wherein, $r_{A,combined}$ is the combined class structure for class A, $r_{total}$ is the total class structure determined in step 250 for the combination of all classes being trained (e.g., class 1, class 2, . . . , class 5), $N_{all}$ is a summation of the number of feature vectors representing each class (e.g., the number of feature vectors for class 1, class 2, . . . , class 5), $N_1$ is the number of feature vectors representing class 1, $N_4$ is the number of feature vectors representing class 4, $r_{A,class}$ is the individual class structure for class A determined in step 240. Preferably, scaling factor input 260 represents a scaling factor term (e.g., $((N_{all}/(N_1+N_4))-2))$ in eqn. 1.

In step 265, the combined class structure is mapped to a matrix for each of the models. In a preferred embodiment, a matrix representing a model, and therefore an associated class, is titled a class matrix. The class matrix for the $A^{th}$ class is represented as, $R_A$. Preferably, the method for mapping a combined class structure, $r_{A,combined}$, to a class matrix, $R_A$, is best illustrated as an example. Consider, for example, the case of a two element combined class structure, $r_{A,combined}$ in eqn. 2, $$r_{A,\ combined} = \begin{bmatrix} r_1 \\ r_2 \\ r_3 \\ r_4 \\ r_5 \\ r_6 \end{bmatrix}. \quad (\text{eqn. 2})$$

The second order expansion (i.e., high order polynomial expansion) for egn. 2 is provided in eqn. 3, $$r_{A,\ combined} = p_2(x) = \begin{bmatrix} 1 \\ x_1 \\ x_2 \\ x_1^2 \\ x_1 x_2 \\ x_2^2 \end{bmatrix}. \quad \text{(eqn. 3)}$$

A square class matrix having row and column dimensions is determined by eqn. 4, $$p(x)p(x)^t = \begin{bmatrix} 1 & x_1 & x_2 \\ x_1 & x_1^2 & x_1 x_2 \\ x_2 & x_1 x_2 & x_2^2 \end{bmatrix} = R_{A'} \quad \text{(eqn. 4)}$$

where $p(x)^t$ represents the transpose of vector $p(x)$.

Therefore, in a preferred embodiment, the mapping of the combined class structure to the class matrix is performed by copying the second order elements (high order polynomial expansion) found in eqn. 3 to the corresponding matrix element in eqn. 4. Again, for example, the $x_1 x_2$ element of eqn. 3 would map to the matrix elements having indices $R_A(3,2)$ and $R_A(2, 3)$. The mapping approach described in step 265 can be extended to higher order systems.

In step 270, the matrix is decomposed for each model. In a preferred embodiment, a class matrix for the $A^{th}$ model, and therefore an associated class, is decomposed using Cholesky decomposition. For example, the Cholesky decomposition for $R_A$ is represented in equation form in eqn. 5, $$L_A^t L_A = R_A, \quad \text{(eqn. 5)}$$

where $L_A^t$ is the transpose of matrix $L_A$ and both matrices are determined using Cholesky decomposition.

In step 275, the model is created for each class. In a preferred embodiment, a model, $W_A$, is determined using back substitution. For example, eqn. 6 can be solved for $W_A$ (e.g., class A model), $$L_A^t L_A W_A = ((N_{all}/(N_1 + N_4)) - 1) * a_A, \quad \text{(eqn. 6)}$$

where $L_A^t$, $L_A$, $W_A$, $N_{all}$, $N_1$, and $N_4$ are each described above. Preferably, $a_A$ is a low order class structure for the $A^{th}$ class. In a preferred embodiment, $a_A$ is determined using a method similar to the method for determining the individual class structure (step 240). The polynomial order for the low order class structure is preferably half the polynomial order for the individual class structure. Since the low order class structure elements are also elements of the individual class structure (step 240), the low order class structure may be determined directly from the individual class structure.

In an alternative embodiment, columns of $R_A$ and the corresponding element of $W_A$ may be eliminated. This operation reduces the number of classifier parameters yielding a smaller implementation.

Additionally, in step 275, a class model may be stored. In a preferred embodiment, a class model for a class is stored in a memory. Among other things, the memory may be a random access memory (RAM), a database, magnetic storage media such as disk or tape, read-only memory (ROM), and other types of suitable data storage.

When training for each model is complete, method 200 then ends 280.

Figure 3:
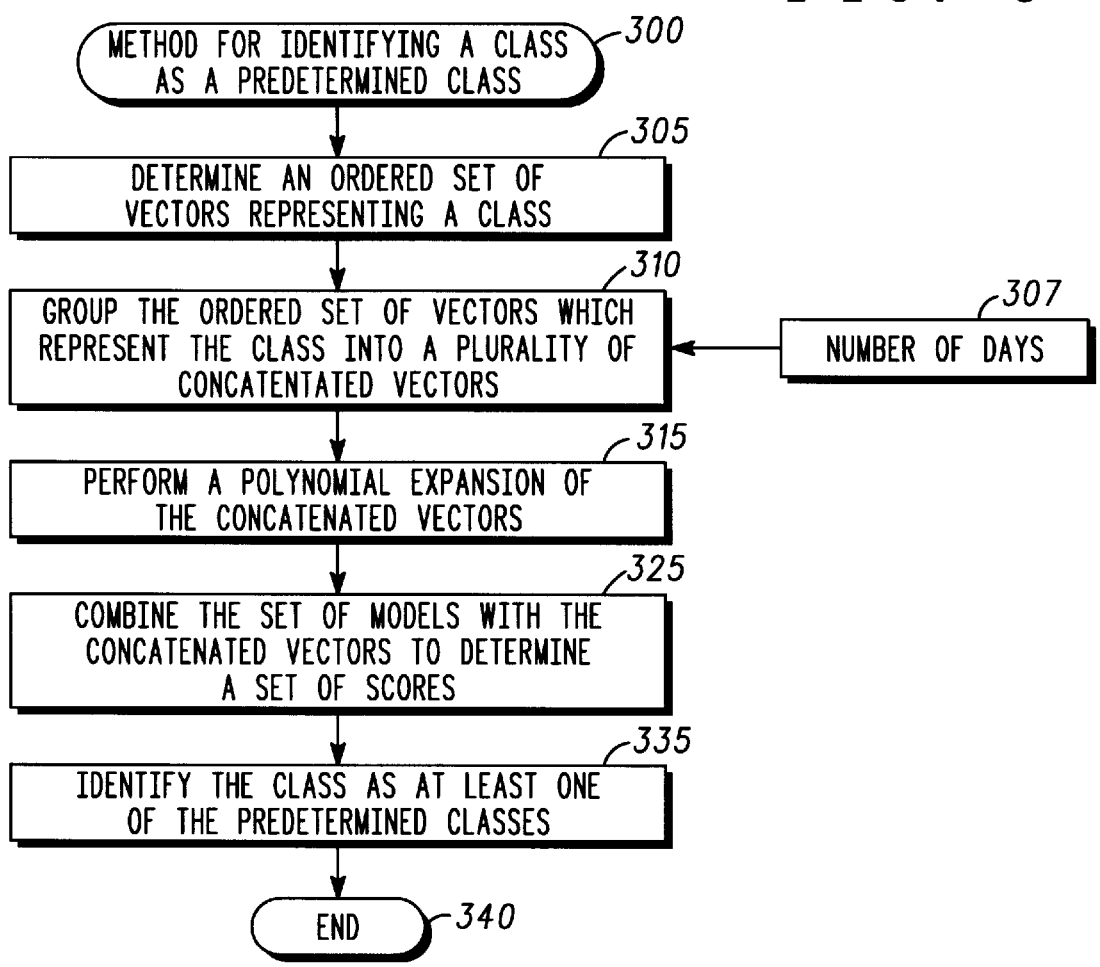
FIG. 3 is a flowchart illustrating a method for identifying a class as a predetermined class in accordance with a preferred embodiment of the present invention.

FIG. 3 is a flowchart illustrating a method for identifying a class as a predetermined class in accordance with a preferred embodiment of the present invention. In a preferred embodiment, method 300 is performed by a combination of delay elements, classifiers, and a selector. Preferably, method 300 describes a method for identifying a class as at least one of a plurality of predetermined classes. Preferably, each of the plurality of predetermined classes is represented by a model associated therewith. A suitable method for training (e.g., creating) models is described in method 200 (FIG. 2).

In step 305, an ordered set of vectors representing a class are determined. In a preferred embodiment, an ordered set of unidentified vectors are determined similar to the method for determining vectors in step 205 (FIG. 2). Preferably, method 300 is performed for each vector in the ordered set of unidentified vectors.

In step 310, the ordered set of vectors, which represent the class, are grouped into a plurality of concatenated vectors. In a preferred embodiment, vectors representing the unidentified class are grouped into a plurality of concatenated vectors similar to the method performed in step 220 (FIG. 2). Number of delays input 307 preferably determines the number of vectors to be grouped in step 310. Additionally, number of delays input 307 is similar to number of delays input 225 (FIG. 2) and is preferably equivalent to the number of delay elements 113–115 (FIG. 1).

In step 315, a polynomial expansion of the concatenated vectors is performed. In a preferred embodiment, a polynomial expansion similar to the polynomial expansion performed in step 230 (FIG. 2) is performed for each of the concatenated vectors determined in step 310.

In step 325, the set of models are combined with the concatenated vectors to determine a set of scores. In a preferred embodiment, a dot product is performed using each of the predetermined models and each of the expanded, concatenated vectors determined in step 315. Preferably, the dot product performed in step 325 produces a scalar value for each dot product.

In step 335, the class is identified as at least one of the predetermined classes. In a preferred embodiment, the series of scalar numbers determined in step 325 is used to identify a class from the predetermined set of classes.

In one embodiment, the series of scalar numbers determined in step 325 is averaged. The series of scalar numbers having the largest average may be associated with the predetermined model which, in part, produced the series. The class associated with the respective model identifies the unidentified class.

In another embodiment, the series of scalar numbers determined in step 325 is searched. The series of scalar numbers having the largest scalar number is associated with a predetermined model which, in part, produced the series. The class associated with the respective model identifies the unidentified class.

In an embodiment where an acoustic context, word, etc., are to be identified, a single model representing the acoustic context, word, etc., is preferably used to determine a series of scalar numbers (e.g., scores). Also, a series of scalar numbers may be smoothed using a filtering technique such as an finite impulse response (FIR) filter. Among other things, smoothing the series of scalar numbers reduces the number of false identifications due to noise. Finally, each of the scores in the series of scalar numbers may be compared to a threshold to determine when an acoustic context, word, etc., has been identified. Otherwise, the acoustic context, word, etc., failed to be identified.

When identifying for each unidentified class is complete, method 300 then ends 340.

Thus, what has been shown are a system and method which use ordering information when performing identification of classes. What has also been shown are a system and method which use ordering information contained within training data to train models. What has also been shown are an improved system and method for determining boundaries between spoken commands. What has also been shown are an improved system and method for detecting an acoustic context. Also shown are an improved system and method for performing word spotting.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A speech classifier comprising:

a feature memory for storing feature vectors that represent predetermined verbal commands;

a training processor for generating command models from the feature vectors;

a command model memory for storing the command models;

a first and second plurality of time-delay elements for sequentially propagating each element of a set of received feature vectors, the set of received feature vectors representing an unidentified spoken command;

a first classifier element coupled with the first plurality of delay elements, the first classifier element combining the sequentially propagated feature vectors from the first plurality of delay elements with a first of the command models and providing a first series of scalar values corresponding to the sequentially propagated feature vectors;

a second classifier element coupled with the second plurality of delay elements, the second classifier element combining the sequentially propagated feature vectors from the second plurality of delay elements with a second of the command models and providing a second series of scalar values corresponding to the sequentially propagated feature vectors; and a selector (112) for selecting one of the command models corresponding to one of the verbal commands based on the first and second series of scalar values.

2. The speech classifier as claimed in claim 1 wherein the training processor generates a predetermined number of command models from the feature vectors, and the model memory stores the predetermined number of command models, and wherein the speech classifier further comprises;

a predetermined number of pluralities of time-delay elements, the predetermined number including said first and second pluralities of time-delay elements; and a predetermined number of classifier elements, the predetermined number including the first and second classifier elements, wherein the predetermined number of classifier elements and the predetermined number of pluralities of time-delay elements correspond with the predetermined number of command models.

3. A method of speech classification comprising the steps of:

storing feature vectors that represent predetermined verbal commands;

generating command models from the feature vectors;

sequentially propagating each element of a set of received feature vectors through a first and second plurality of time-delay elements, the set of received feature vectors representing an unidentified spoken command;

combining in a first classifier element the sequentially propagated feature vectors from the first plurality of delay elements with a first of the command models to provide a first series of scalar values corresponding to the sequentially propagated feature vectors;

combining in a second classifier element the sequentially propagated feature vectors from the second plurality of delay elements with a second of the command models to provide a second series of scalar values corresponding to the sequentially propagated feature vectors; and selecting one of the command models corresponding to one of the verbal commands based on the first and second series of scalar values.

4. The method as claimed in claim 3:

wherein the generating step comprises generating a predetermined number of said command models from the feature vectors wherein the sequentially propagating step further comprises the step of sequentially propagating each element of the received feature vectors through a predetermined number of pluralities of time-delay elements;

wherein the combining step further comprises the step of combining the sequentially propagated feature vectors from the time delay elements in a corresponding classifier element of a predetermined number of classifier elements, and wherein a predetermined number of pluralities of time-delay element include said first and second pluralities of time-delay elements, said predetermined number of classifier elements include the first and second classifier elements, and wherein the predetermined number of classifier elements and the predetermined number of pluralities of time-delay elements correspond with the predetermined number of command models.

* * * * *